United States Patent
Woodard et al.

(10) Patent No.: US 11,980,840 B2
(45) Date of Patent: *May 14, 2024

(54) SYSTEM AND METHOD FOR ENHANCING ADSORPTION OF CONTAMINATED VAPORS TO INCREASE TREATMENT CAPACITY OF A REGENERABLE, SYNTHETIC ADSORPTIVE MEDIA

(71) Applicant: Emerging Compounds Treatment Technologies, Inc., Irvine, CA (US)

(72) Inventors: Steven E. Woodard, Cumberland, ME (US); Andrew G. Bishop, Cumberland, ME (US); Michael G. Nickelsen, Fuquay-Varina, NC (US); John C. Berry, Mooresville, NC (US)

(73) Assignee: Emerging Compounds Treatment Technologies, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/844,114

(22) Filed: Jun. 20, 2022

(65) Prior Publication Data
US 2022/0314160 A1    Oct. 6, 2022

Related U.S. Application Data

(63) Continuation of application No. 16/871,776, filed on May 11, 2020, now Pat. No. 11,364,464, which is a
(Continued)

(51) Int. Cl.
*B01D 53/04* (2006.01)
*B01D 53/00* (2006.01)
*B01D 53/02* (2006.01)

(52) U.S. Cl.
CPC ....... *B01D 53/0438* (2013.01); *B01D 53/002* (2013.01); *B01D 53/02* (2013.01);
(Continued)

(58) Field of Classification Search
CPC ...... B01D 53/02; B01D 53/002; B01D 53/04; B01D 53/0454; B01D 53/0438;
(Continued)

(56) References Cited

U.S. PATENT DOCUMENTS

| 8,500,886 | B2 * | 8/2013 | Okano ................. B01D 53/06 96/123 |
| 10,695,709 | B2 * | 6/2020 | Woodard ............ B01D 53/002 |
| 11,364,464 | B2 * | 6/2022 | Woodard .............. B01D 53/02 |

FOREIGN PATENT DOCUMENTS

JP    2007197548 A  *  8/2007

OTHER PUBLICATIONS

Machine-generated English translation of JP 2007-197548 A, published Aug. 2007.*

* cited by examiner

*Primary Examiner* — Frank M Lawrence, Jr.
(74) *Attorney, Agent, or Firm* — Iandiorio Teska & Coleman, LLP

(57) ABSTRACT

A system for enhancing adsorption of contaminated vapors to increase treatment capacity of a regenerable, synthetic adsorptive media. The system includes an inlet configured to receive a flow of contaminated vapors. One or more vessels are coupled to the inlet, the one or more vessels each including a regenerable, synthetic adsorptive media therein, are configured to remove contaminants from the vapors by adsorption. A vapor cooling subsystem is coupled to the inlet, and configured to cool the flow of contaminated vapors, thereby increasing the treatment capacity of the regenerable synthetic adsorptive media.

13 Claims, 6 Drawing Sheets

Related U.S. Application Data continuation of application No. 15/866,683, filed on Jan. 10, 2018, now Pat. No. 10,695,709.

(60) Provisional application No. 62/444,551, filed on Jan. 10, 2017.

(52) U.S. Cl.
CPC .... *B01D 53/0454* (2013.01); *B01D 2253/202* (2013.01); *B01D 2257/70* (2013.01); *B01D 2259/40001* (2013.01); *B01D 2259/4009* (2013.01); *B01D 2259/41* (2013.01)

(58) Field of Classification Search
CPC .......... B01D 2253/202; B01D 2256/10; B01D 2258/06; B01D 2257/70; B01D 2259/40001; B01D 2259/4009; B01D 2259/41
USPC .... 95/114, 148, 900; 96/121, 122, 126, 130, 96/131, 145
See application file for complete search history.

SYSTEM AND METHOD FOR ENHANCING ADSORPTION OF CONTAMINATED VAPORS TO INCREASE TREATMENT CAPACITY OF A REGENERABLE, SYNTHETIC ADSORPTIVE MEDIA

RELATED APPLICATIONS

This application is a continuation of U.S. patent application Ser. No. 16/871,776 filed May 11, 2020, under 35 U.S.C. §§ 119, 120, 363, 365, and 37 C.F.R. § 1.55 and § 1.78, which claims benefit and priority to U.S. patent application Ser. No. 15/866,683 filed Jan. 10, 2018, under 35 U.S.C. §§ 119, 120, 363, 365, and 37 C.F.R. § 1.55 and § 1.78, which claims benefit of and priority to U.S. Provisional Application Ser. No. 62/444,551 filed Jan. 10, 2017, under 35 U.S.C. §§ 119, 120, 363, 365, and 37 C.F.R. § 1.55 and § 1.78, which are incorporated herein by this reference.

FIELD OF THE INVENTION

This invention relates to a system and method for enhancing adsorption of contaminated vapors to increase treatment capacity of a regenerable, synthetic adsorptive media.

BACKGROUND OF THE INVENTION

Various manufacturing facilities, such as petroleum refineries, chemical production plants, and the like, may generate a significant amount of vapors that are contaminated with hydrocarbons, volatile organic compounds, and the like, that are typically treated and expelled through various types of discharge vents.

Many conventional systems and methods used in petroleum refineries, chemical production plants, and the like, typically rely on granular activated carbon (GAC) systems and methods to remove the contaminants from the vapors that are expelled through the discharge vents and/or process sewers. The process typically involves directing the contaminated vapors to two vessels, connected in series as lead and lag vessels, each having granular activated carbon (GAC) therein. The contaminated vapors adsorb to the GAC to provide treated vapors which are discharged to the atmosphere. The discharged vapors must meet strict federal regulatory compliance guidelines, e.g., provided by the Benzene Waste Operations National Emission Standards for Hazardous Air Pollutants (NESHAPs), also known as "BWON."

However, such conventional systems and methods require frequent and expensive replacement of the GAC in the treatment vessels. This results in process interruption during the replacement process, logistical complexities associated with moving the vessels throughout the manufacturing facilities, potential operator error during vessel exchange, safety concerns, potential for carbon bed fires, liability concerns associated with the waste byproducts from the regeneration of the GAC, and environmental concerns such as inconsistent regulatory compliance.

Some conventional systems and methods which utilize GAC to remove contaminated vapors may use heat exchangers to dehumidify the flow of contaminated vapors. This is done because GAC can be adversely impacted by humidity. Heat exchangers are also sometimes used to prevent bed fires, hydrocarbon polymerization, and/or oxidation of some solvents to toxic or insoluble compounds. See e.g., Khan et al., "Removal of Volatile Organic Compounds From Polluted Air", *Journal of Loss Prevention in the Process Industries*, 13 (2000), 527-545, and Muzenda, E., "A Critical Discussion of Volatile Organic Compounds Recovery Techniques", *International Journal of Biological, Ecological and Environmental Sciences* Vol. 2, No. 4, 2013, 73-78, both incorporated by reference herein.

One significant challenge of systems and methods which use GAC for treating contaminated vapors is the inability to effectively regenerate the spent or used GAC on-site at the facility. Conventional systems and methods which attempt to regenerate the spent GAC on-site provide incomplete regeneration because they may not be able to fully desorb (e.g., remove) the contaminants from the spent GAC. This results in a phenomenon known as "heel development," and the spent GAC must be transported off site to a thermal regeneration facility, where the carbon is heated to about 1,500° F. to about 1,700° F. thereby destroying the adsorbed contaminants.

The challenge of heel development may be overcome by using synthetic adsorptive media in place of GAC in the vessels. Examples of synthetic adsorptive media include, inter alia, polymeric resins, such as DOWEX OPTIPORE® V503 and carbonaceous resins, such as AMBERSORB® 560. These resins may be regenerated in place, on-site, in the vessels using steam from the facility and may be reused, typically hundreds or thousands of times, without significant heel development and without the need move or transport the synthetic adsorptive media or the vessel(s).

The disadvantages associated with synthetic adsorptive media include: it is more expensive than GAC and typically has a lower adsorptive capacity for the hydrocarbon contaminants at petroleum refineries, chemical production facilities, and the like. The advantages of synthetic adsorptive media include: it can be regenerated on-site and in place in the vessels using sources of steam from the facility and typically does not have any problems associated with heel development and therefore can be regenerated many times without significant loss of capacity. Moreover, synthetic adsorptive media is not adversely impacted by humidity. Thus, a contaminated vapor stream from the regeneration process does not require dehumidification prior to treatment, which may be needed by some conventional GAC systems and methods.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

As discussed in the Background section, various manufacturing facilities such as petroleum refineries, chemical production plants, and the like, generate a significant amount of contaminated vapors.

Figure 1:
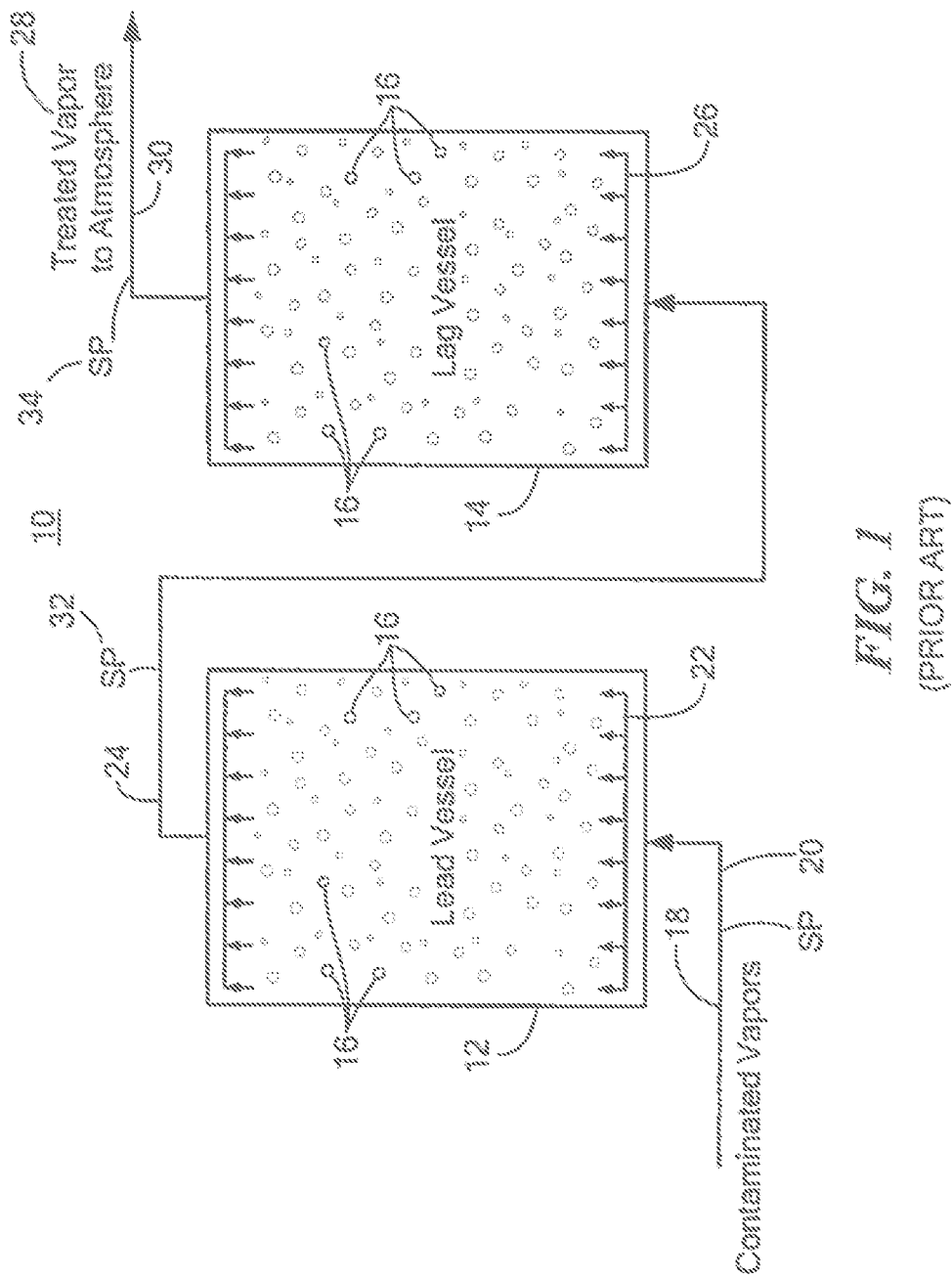
FIG. 1 is a schematic block diagram showing one example of a conventional system to remove contaminated vapors by adsorption to GAC stored in a lead vessel and a lag vessel.

FIG. 1 shows one example of a conventional system which may be used to remove contaminated vapors by adsorbing the contaminated vapors on to GAC stored in a vessel. In this example, conventional contaminated vapor removal system 10 includes lead vessel 12 and lag vessel 14, both having GAC 16 therein, exemplary indicated as shown, which removes contaminated vapors 18 by adsorption.

In this example, lead vessel 12 may receive contaminated vapors 18, e.g., form petroleum refineries, chemical production plants, and the like by inlet 20 and introduces contaminated vapors 18 into lead vessel 12 by diffuser 22. A blower is often utilized to introduce a flow of contaminated vapors 18 into lead vessel 12. GAC 16 in lead vessel 12 then removes contaminated vapors 18 by adsorption. In order to ensure redundancy that minimizes contaminated vapor 18 emission to the atmosphere, system 10 outputs the flow of any remaining contaminated vapors 18 from lead vessel 12 into lag vessel 14 by line 24. Lag vessel 14 introduces contaminated vapors 18 into lag vessel 14 via diffuser 26 and performs additional adsorption of contaminated vapors 18 using GAC 16. The final treated vapors or effluent 28 is discharged into the atmosphere by outlet 30.

Figure 2:
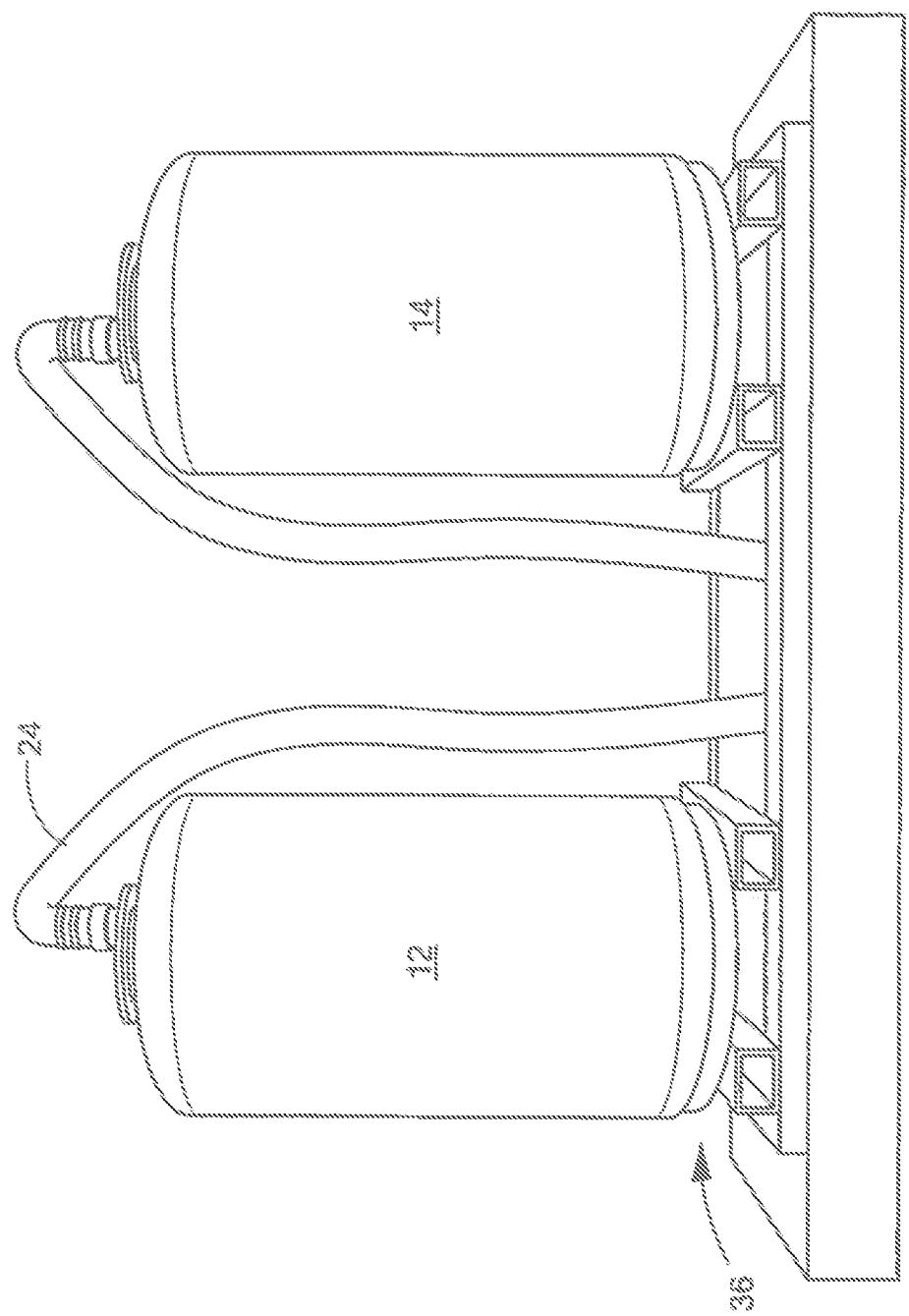
FIG. 2 is a three-dimensional view showing an example of conventional GAC vessels which need to be removed from the facility for regeneration.

During operation, the concentration level of contaminated vapors 18 in line 24 is frequently monitored via tap 32, using a photoionization detector (PID), or similar type device. Similarly, the concentration level of contaminated vapors 18 in outlet 30 is frequently monitored by tap 34, using a PID, or similar type device. When it is determined at tap 32 that the concentration of contaminated vapors 18 output by lead vessel 12 in line 24 is too high, lead vessel 12 with GAC 16 therein must be replaced with a new vessel having clean GAC 16. To do this, the flow of contaminated vapors 18 in inlet 20 is interrupted and completely stopped and directed to lag vessel 14. Lead vessel 12 with GAC 16 therein is disconnected from system 10 and transported throughout the manufacturing facility, petroleum refineries, chemical production plants, and the like, to an offsite location for regeneration. The process of replacing lead vessel 12 is very cumbersome, is manually performed by human operators, and requires decoupling hoses and the like. The process requires manually decoupling inlet 20 and line 24, typically in the form of large bulky hoses, e.g., line 24, shown in FIG. 2, where like parts have been given like numbers. After being decoupled, the vessel with used GAC, e.g., lead vessel 12, is transported through manufacturing facilities, such as petroleum refineries, chemical production plants, and the like, typically with forklift to a location where GAC 16 in lead vessel 12 can loaded onto a truck and transported off site for thermal regeneration. This a cumbersome, time consuming, manual process has the potential for operator error, results in a logistical complexities associated with moving vessels throughout the facility, potential operator error during vessel exchange, and inconsistent regulatory compliance. There are also liability concerns associated with waste products of the GAC regeneration process. Additionally, complexity, labor and cost are introduced when both the lead and lag vessels are replaced at the same time.

Figure 3:
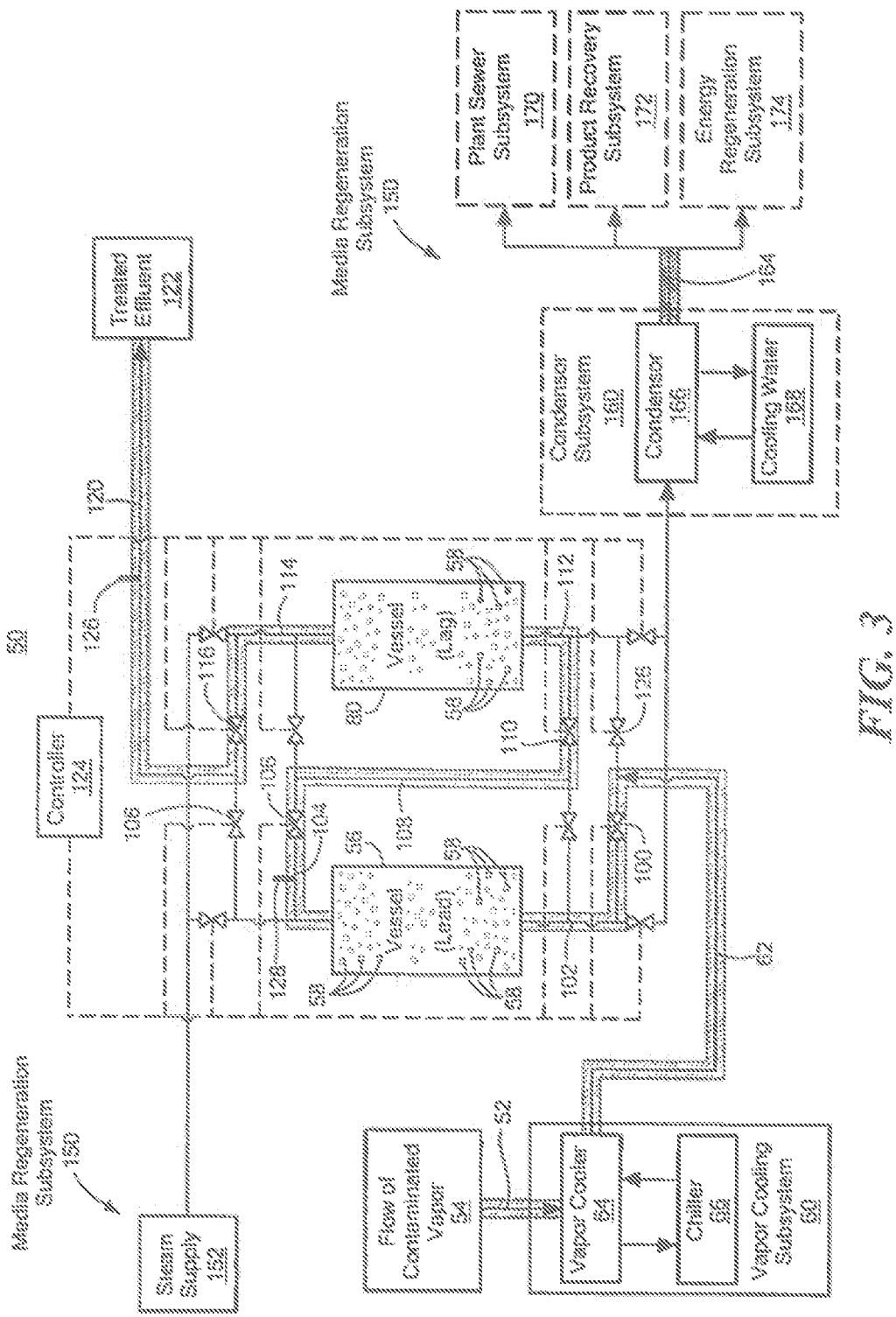
FIG. 3 is a schematic block diagram showing the primary components of one embodiment of the system for enhancing adsorption of contaminated vapors to increase treatment capacity of adsorbed media of this invention.

There is shown in FIG. 3, one embodiment of system 50 and the method thereof for enhancing adsorption of contaminated vapors to increase treatment capacity of a regenerable, synthetic adsorptive media. System 50 includes inlet 52 configured to receive flow 54 of contaminated vapors, e.g., from various manufacturing facilities, such as petroleum refineries, chemical production plants, and the like. Unlike conventional system 10 discussed above with reference to FIG. 1 which uses GAC 16, system 50 includes regenerable, synthetic adsorptive media or resin exemplary indicated at 58 in vessel 56 and/or vessel 80. Because system 50 uses synthetic adsorptive media 58 in vessel 56 and/or 80 it can be regenerated on-site at various manufacturing facilities, such as petroleum refineries, chemical production plants, and the like, in-place in vessel 56 and/or 80 using a steam source, e.g., steam supply 152 (discussed below) that is readily available at the facility. Vessel 56 and/or 80 are each configured to remove contaminants from a cooled flow of contaminated vapors 54 by adsorption onto the synthetic adsorptive media. To provide the cooled flow of contaminated vapors, system 50 includes vapor cooling subsystem 60, coupled to inlet 52, configured to cool the flow of contaminated vapors 54 in inlet 52 and output a cooled flow of contaminated vapors 54 in fluidic line 62. In one design, vapor cooling subsystem 60 includes vapor cooler 64 and chiller 66 configured to cool flow of contaminated vapors 54 to a desired lower temperate, e.g., any low temperature in the range of about 0° F. to about 70° F., and output the cooled flow of contaminated vapors 54 by fluidic line 62.

In one example, synthetic adsorptive media 58 may include a synthetic adsorptive media, e.g., a polymeric resin, such as DOWEX OPTIPORE® V503, or a carbonaceous resin, such as AMBERSORB® 560.

The inventor hereof found that by cooling flow of contaminated vapors 54 with vapor cooling subsystem 60 before flow of contaminated vapors 54 enters vessel 56 or vessel 80, the capacity of synthetic adsorptive media 58 in vessel 56 and/or vessel 80 is significantly increased. In one example, the flow of contaminated vapors 54 in inlet 52 was cooled from about cooled from about 90° F. in inlet 52 to about 70° F. in fluidic line 62 using vapor cooling subsystem 60. In this example, the cooling of about 20° F. increased the treatment capacity of synthetic adsorptive media 58, in this example DOWEX OPTIPORE® V503, by more than 100 percent. In other examples, the flow of contaminated vapors 54 in inlet 52 may be cooled in fluidic line 62 to any of the desired low temperatures discussed above using vapor cooling subsystem 60 and the treatment capacity of synthetic adsorptive media 58 will increase depending on the cooled temperature of cooled flow of contaminated vapors in fluidic line 62.

Increasing the capacity of synthetic adsorptive media 58 in vessel 56 and/or vessel 80 by providing a cooled flow of contaminated vapors using vapor cooling subsystem 60 reduces the amount of adsorptive synthetic media required, and hence the size of the vessels 56 and/or 80 can be reduced, which may reduce the overall size of system 50. This reduces the footprint requirements and capital cost associated with system 50.

One or more embodiment of system 50 and the method thereof for enhancing adsorption of contaminated vapors to increase treatment capacity of regenerable, synthetic adsorptive media overcomes the economic challenges associated with using synthetic adsorptive media for vapor treatment.

After discovering that the adsorptive (e.g., treatment) capacity of synthetic adsorptive media can be substantially increased by lowering the temperature of the incoming contaminated vapors with cooling subsystem 50, the cost disadvantages associated with using synthetic adsorptive media are overcome which can significantly reduce the amount (e.g., by about 50% to about 80%) of synthetic adsorptive media required for treatment. This appreciably reduces the overall size of system 50 and the cost of treatment. Further, many of the contaminated vapor streams at the various manufacturing facilities, such as petroleum refineries, chemical production plants, and the like are passively vented, and thus have very low flowrates (e.g., less than 2 scfm). Such low flow rates facilitate the use of small, and therefore inexpensive, vapor cooling systems. The combination of small, inexpensive vapor cooling subsystem 60 of one or more embodiments of this invention and its substantial beneficial impact on the size and cost of system 50 overcomes the economic challenge associated with using synthetic media to treat contaminated vapors. The result is system 50 and the method thereof for enhancing adsorption of contaminated vapors to increase treatment capacity of a regenerable, synthetic adsorptive media of one or more embodiment of this invention provides a cost-effective, compact, sustainable contaminated vapor treatment system and method that can regenerate the synthetic adsorptive media on-site at the facility and in-place in the vessel, as discussed in detail below, to effectively overcome the multiple challenges associated with using GAC and synthetic media as discussed above.

In one design, the one or more vessels of system 50, FIG. 3, preferably includes a plurality of vessels, each with synthetic adsorptive media 58 therein, e.g., vessel 56 with synthetic adsorptive media 58 therein, configured as a lead vessel 56 as shown, and vessel 80 with synthetic adsorptive media 58 therein configured as a lag vessel 80 as shown.

In the example shown in FIG. 3, flow of contaminated vapors 54 enters inlet 52 and is cooled by vapor cooling subsystem 60 and the cooled flow of contaminated vapors 54 in fluidic line 62 is input to valve 100, which is preferably automated, coupled to, and controlled by controller 124. Valve 100 directs the flow of cooled contaminated vapors 54 to line 102 and into lead vessel 56 as shown. The contaminated vapors in cooled flow of contaminated vapors 54 are removed by adsorption using synthetic adsorptive media 58. The output of lead vessel 56 by line 104 is then directed to valve 106, which is preferably automated, coupled to, and controlled by controller 124. Valve 106 then directs flow of contaminated vapors 54 to line 108 and into valve 110, which is preferably automated, coupled to, and controlled by controller 124. Valve 110 then directs loaded flow of contaminated vapors 54 by line 112 into lag vessel 80 with synthetic adsorptive media 58 therein which desorbs any remaining contaminated vapors by adsorption. The output of lag vessel 80 is then directed to line 114 and valve 116, which is preferably automated, coupled to, and controlled by controller 124. Valve 116 directs the output of lag vessel 80 to outlet 120 as treated effluent 122, which is expelled into the atmosphere.

System 50 also preferably includes tap 128, e.g., a PID or similar type device, coupled to line 104 and controller 124 which can be used to monitor the concentration of contaminated vapors in cooled flow of contaminated vapors 54 in line 104 output by lead vessel 56. System 50 also preferably includes tap 126, e.g. a PID or similar type device, coupled to outlet 120 which can be used to monitor the concentration any contaminated vapors in outlet 120.

When it is determined that the concentration of contaminated vapors output by one of vessel 56 or vessel 80 exceeds a predetermined concentration, e.g., 50 parts per million, which indicates synthetic adsorptive media 58 in vessel 56 or vessel 80 needs to be regenerated, system 50 includes media regeneration subsystem 150 coupled to one of vessel 56 or vessel 80. Media regeneration subsystem 150 is configured to receive steam 152, e.g., steam from various manufacturing facilities, such as petroleum refineries, chemical production plants, and the like, and direct stream 152 through synthetic adsorptive media 58 in one of vessel 56 or vessel 80 to remove contaminants adsorbed to media 56 by desorption to effectively and efficiently regenerate synthetic adsorptive media 58.

Figure 4:
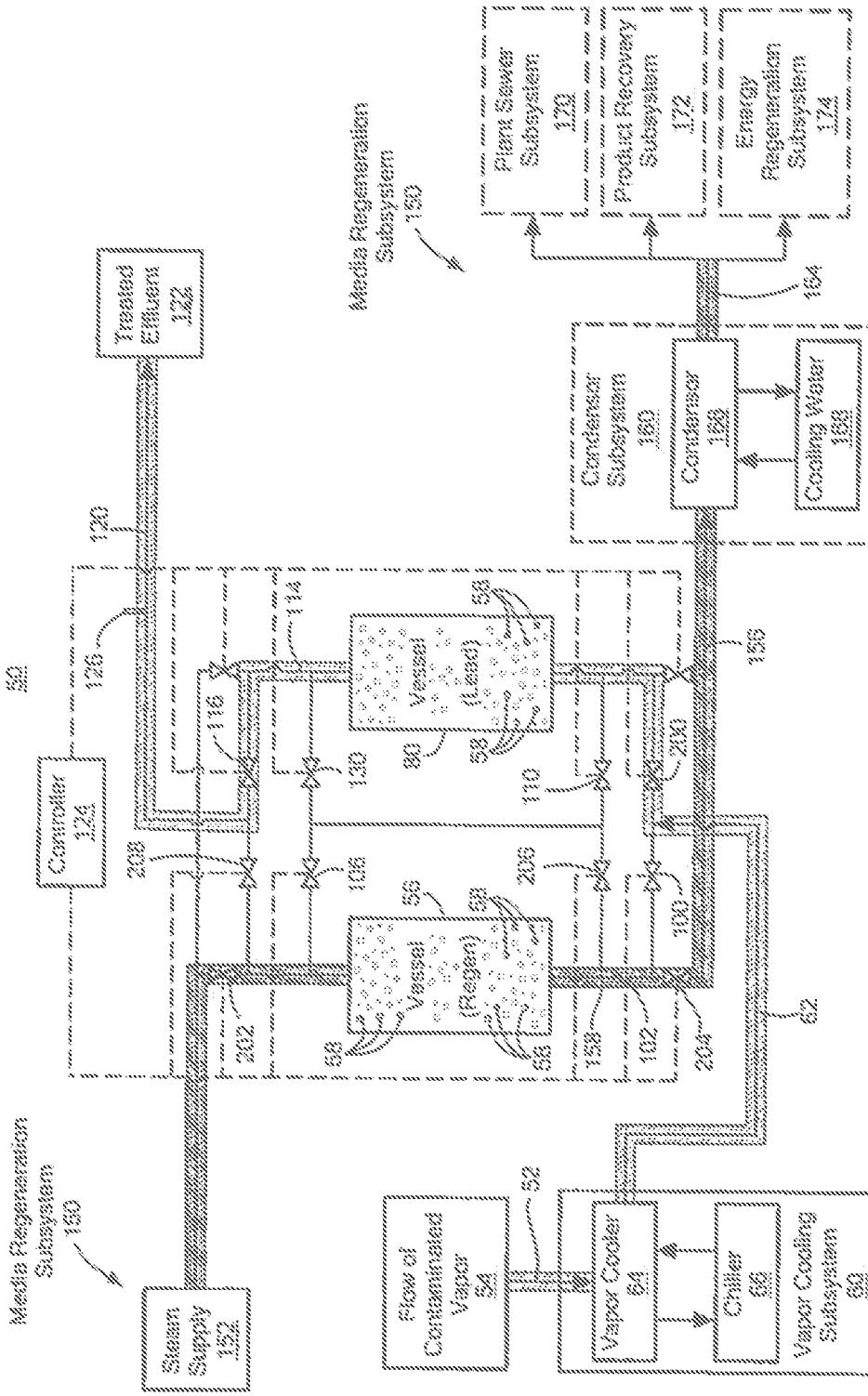
FIG. 4 is a schematic block diagram of one embodiment of a media regeneration subsystem which may be used to regenerate the media in lead vessel shown in FIG. 3.

In the example shown in FIG. 3, when it is determined that the concentration of contaminated vapors output by lead vessel 56 in line 104 exceeds a predetermined concentration, cooled flow of contaminated vapors 54 in fluidic line 62, FIG. 4, where like parts have been given like numbers is directed to lag vessel 80, which now becomes lead vessel 80, by closing valve 100, FIG. 3, and opening valve 200, FIG. 4, which is preferably automated, coupled to, and controlled by controller 124. At this point in time, lead vessel 80 in system 50 is the only vessel operating, and system 50 is running "naked". In this example, system 50 utilizes media regeneration subsystem 150 to direct steam 152 into vessel 56, at this point termed regeneration vessel 56, by opening valve 202, which is preferably automated, coupled to, and controlled by controller 124, and directing the steam to regeneration vessel 56. Steam 152 removes contaminants adsorbed to media 56 by desorption, thereby effectively and efficiently regenerating synthetic adsorptive media 58 in regeneration vessel 56.

Media regeneration subsystem 150 preferably includes outlet 156 coupled to regeneration vessel 56 by valve 204, which is preferably automated, coupled to, and controlled by controller 124, and fluidic lines 158, which direct contaminated steam output from regeneration vessel 56 to condenser subsystem 160. Condenser subsystem 160 condenses contaminated steam to a liquid and outputs the liquid by line 164. Condenser system 160 preferably includes condenser 166 which receives cooling water 168. In one example, cooling water 168 may be from a petroleum refinery, chemical production plant, and the like. The liquid in line 164 is then preferably directed to plant sewer subsystem 170, product recovery system 172 and/or energy regeneration subsystem 174.

Figure 5:
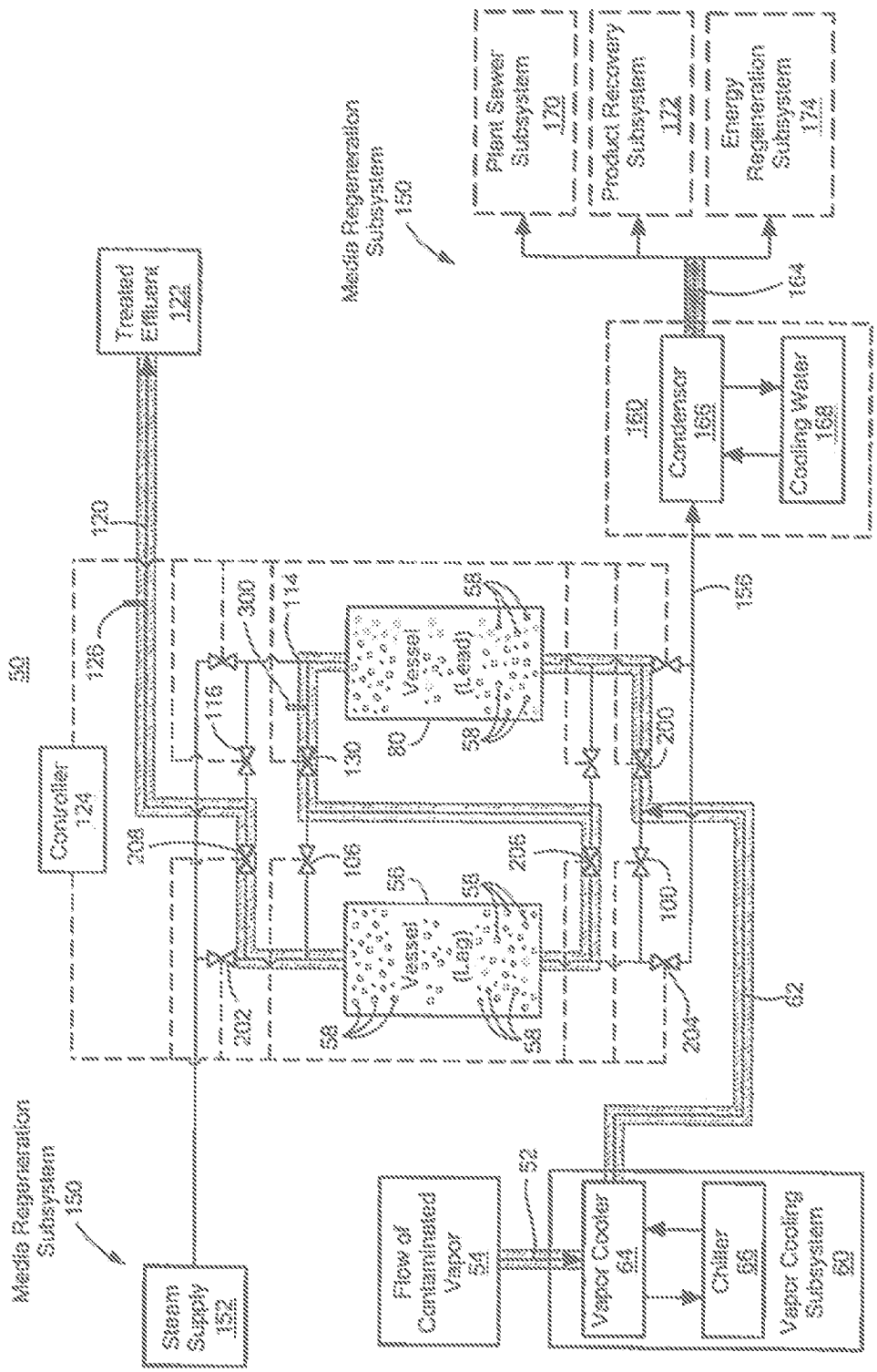
FIG. 5 is a schematic block diagram showing the primary components of another embodiment of the system for enhancing adsorption of contaminated vapors to increase treatment capacity of adsorbed media, where the lead vessel and a lag vessel shown in FIG. 3 have be reversed.

After synthetic adsorptive media 58 in regeneration vessel 56 has been successfully regenerated, valves 202, 204, and 116 are closed, and valves 130, 206, and 208, which are preferably automated, coupled to, and controlled by controller 124 are opened such that regeneration vessel 56 becomes lag vessel 56 with lead vessel 80, as shown in FIG. 5, where like parts have been given like numbers.

Figure 6:
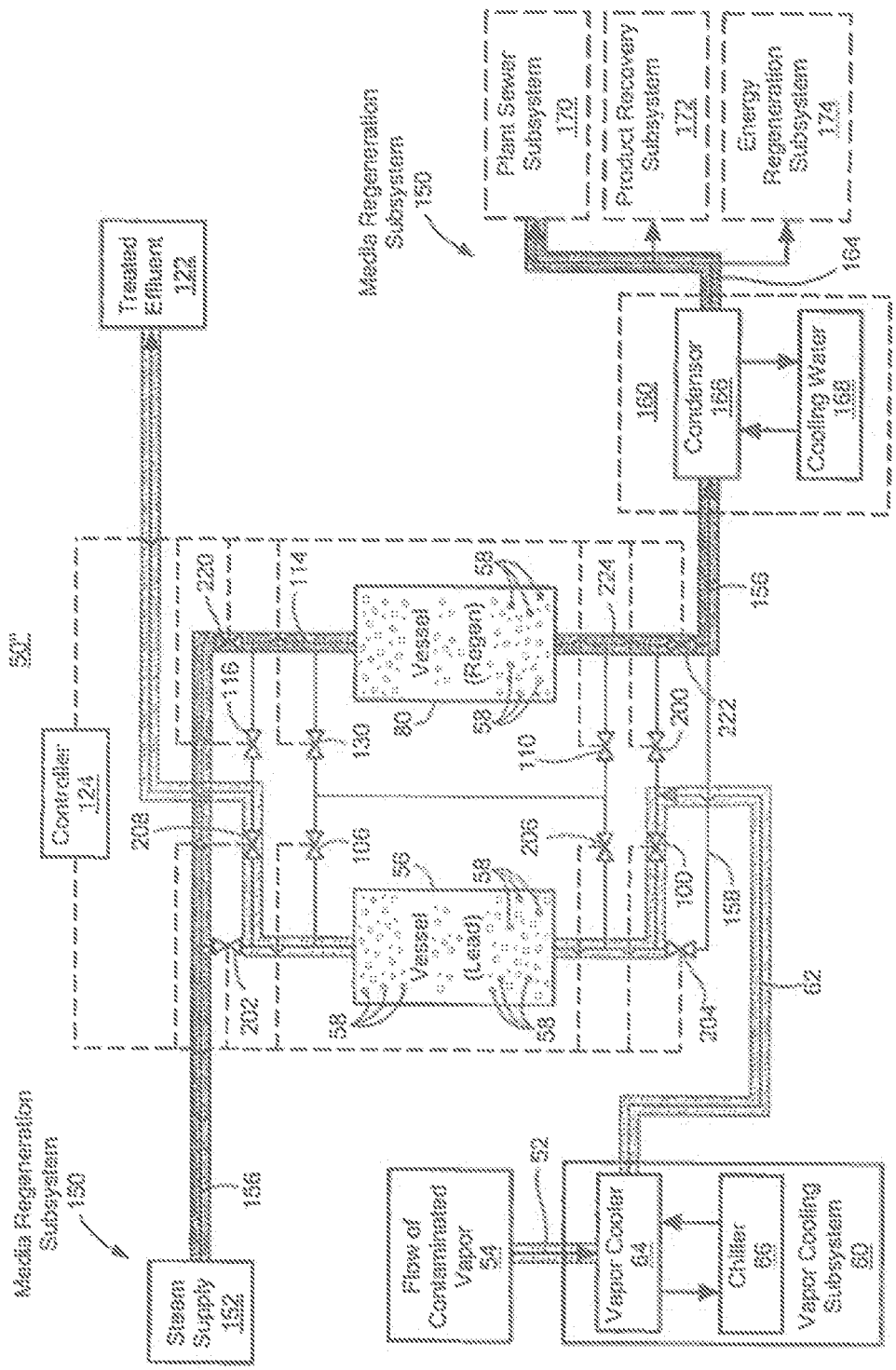
FIG. 6 is a schematic block diagram of another embodiment of a media regeneration subsystem which may be used to regenerate the media in the lead vessel shown in FIG. 5.

In another example, when it is determined that the concentration of contaminated vapors output by lead vessel 80, FIG. 5, in line 114 exceeds a predetermined concentration, e.g., using tap 300, a PID or similar type device, cooled flow of contaminated vapors 54 in fluidic line 62 is directed to lag vessel 56. FIG. 6, where like parts have been given like numbers, now becomes lead vessel 56, by closing valves 106, 200, and 206 and opening valves 100 and 208, as shown in FIG. 6, where like parts have been given like numbers. At this point in time, lead vessel 56 in system 50 is the only vessel operating, and system 50 is running "naked".

In this example, system 50 utilizes media regeneration subsystem 150 to direct steam 152 into vessel 80, at this point termed regeneration vessel 80, by opening valve 220, which is preferably automated, coupled to, and controlled by controller 124, and directing the steam to regeneration vessel 80. Steam 152 removes contaminants adsorbed to synthetic adsorptive media 58 by desorption, thereby effectively and efficiently regenerating synthetic adsorptive media 58 in regeneration vessel 80.

Similarly, as discussed above with reference to FIG. 5, regeneration subsystem 150 preferably includes outlet 156 coupled regeneration vessel 80 by valve 222, which is preferably automated, coupled to, and controlled by controller 124, and line 224 which direct contaminated steam output from regeneration vessel 56 to outlet 156 coupled to condenser system 160. Condenser system 160 condenses contaminated steam to a liquid and outputs the liquid by line 164. Condenser system 160 preferably includes condenser 166 which receives cooling water 168. In one example, cooling water 168 may be from a petroleum refinery, chemical production plant, and the like. The liquid in line 164 may be directed to plant recovery subsystem 170, product recovery system 172 and/or energy regeneration subsystem 174.

After synthetic adsorptive media 58 in regeneration vessel 80 has been successfully regenerated, valves 208, 220 and 222, are closed, and valves 106, 110 and 116 are opened, and any needed appropriate valves are closed and open such that regenerant vessel 56 becomes the becomes lag vessel 80 as shown in FIG. 3, with vessel 56 in the lead position.

Controller 124 shown in one or more of FIGS. 3-6 may be a processor, one or more processors, an application-specific integrated circuit (ASIC), firmware, hardware, and/or software (including firmware, resident software, micro-code, and the like) or a combination of both hardware and software that may all generally be referred to herein as a "controller", which may be part of the system and method for enhancing adsorption of contaminated vapors to increase treatment capacity of a regenerable, synthetic adsorptive media of this invention Computer program code for the programs for carrying out the instructions or operation of one or more embodiments of the system 50 and method thereof for enhancing adsorption of contaminated vapors to increase treatment capacity of a regenerable, synthetic adsorptive media and controller 124 of this invention may be written in any combination of one or more programming languages, including an object oriented programming language, e.g., C++, Smalltalk, Java, and the like, or conventional procedural programming languages, such as the "C" programming language or similar programming languages.

The result is system 50 and the method thereof enhances adsorption of contaminated vapors to increase the treatment capacity of a synthetic adsorptive media. Thus, system 50 can be significantly decreased in size, when compared to conventional systems which remove contaminated vapors by adsorption. This significantly reduces footprint of system 50, the costs, and the problems associated with having to replace a vessel or vessels having spent adsorptive media therein, as discussed above. In one example, the increased treatment capacity of the adsorptive media configured DOWEX OPTIPORE® V503 of system 50 was at least twice that of an adsorptive media configured DOWEX OPTIPORE® V503 system, which was not cooled by vapor cooling subsystem 60. Additionally, media regeneration subsystem 150, with the plurality of preferably automated valves, fluidic lines, and controller 124 eliminates process interruption and the need to manually replace vessels containing GAC therein by human operators. This reduces environmental concerns such as inconsistent regulatory compliance and eliminates the problems associated with the logistical complexities of moving vessels throughout the manufacturing facilities and potential human operator error during vessel exchange, which can also result in inconsistent regulatory compliance. System 50 also does not require any fans or blowers to direct the flow of contaminated vapors into the one or more of the vessels having the adsorptive media therein.

Although specific features of the invention are shown in some drawings and not in others, this is for convenience only, as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A system for enhancing adsorption of contaminated vapors to increase treatment capacity of a regenerable, synthetic, hydrophobic, adsorptive media, the system comprising:
   one or more vessels configured to receive a flow of contaminated vapors, the one or more vessels each including a regenerable, synthetic, hydrophobic, adsorptive media therein configured to remove contaminants from the vapors by adsorption; and
   a vapor cooling subsystem coupled to the one or more vessels configured to cool the flow of contaminated vapors thereby increasing the treatment capacity of the regenerable synthetic hydrophobic adsorptive media.

2. The system of claim 1 in which the regenerable, synthetic, hydrophobic, adsorptive media includes polymeric resin.

3. The system of claim 1 in which the regenerable, synthetic, hydrophobic, adsorptive media includes carbonaceous resin.

4. The system of claim 1 further including a media regeneration subsystem coupled to one of the one or more vessels, the media regeneration subsystem including an inlet configured to receive steam and direct the steam through the regenerable, synthetic, hydrophobic, adsorptive media in one or more of the one or more vessels to remove contaminants adsorbed to the media by desorption to regenerate the adsorptive media in-place in the one or more vessels.

5. The system of claim 4 in which the steam includes steam from a source of steam at a petroleum facility or a chemical production plant.

6. The system of claim 4 in which the media regeneration subsystem further includes an outlet coupled to one of the one or more vessels configured to direct contaminated steam to a condenser, the condenser configured to condense the contaminated steam to form a liquid.

7. The system of claim 6 in which the liquid is directed to a plant sewer subsystem.

8. The system of claim 6 in which the liquid is directed to a product recovery subsystem.

9. The system of claim 6 in which the liquid is directed to an energy generation subsystem.

10. The system of claim 6 in which the condenser is cooled by water from a source of cooling water at a petroleum facility or a chemical production plant.

11. The system of claim 1 in which the one or more vessels includes a lead vessel and a lag vessel.

12. The system of claim 4 in which the media regeneration subsystem further includes a plurality of automated valves, coupled to a plurality of fluidic lines, and a controller coupled to the automated valves.

13. The system of claim 12 in which the media regeneration subsystem is automated to eliminate process interruption.

\* \* \* \* \*